(12) United States Patent
Rieger et al.

(10) Patent No.: US 9,463,404 B2
(45) Date of Patent: *Oct. 11, 2016

(54) AIR FILTER ELEMENT WITH RETAINING GEOMETRY

(71) Applicant: MANN+HUMMEL GMBH, Ludwigsburg (DE)

(72) Inventors: Mario Rieger, Ludwigsburg (DE); Werner Blossey, Benningen (DE); Pascal Neef, Renningen (DE); Gelase Mbadinga Mouanda, Bietigheim-Bissingen (DE); Sven Epli, Heilbronn (DE); Franziska Schulz, Schifferstadt (DE); Martin Schmid, Reisbach (DE); Alfons-Alois Schwinghammer, Dingolfing (DE); Joachim-Paul Krieger, Reisbach (DE); Michael Kolmeder, Dingolfing (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 95 days.

This patent is subject to a terminal disclaimer.

(21) Appl. No.: 14/331,058

(22) Filed: Jul. 14, 2014

(65) Prior Publication Data

US 2014/0318091 A1 Oct. 30, 2014

Related U.S. Application Data

(63) Continuation of application No. PCT/EP2013/050578, filed on Jan. 14, 2013.

(30) Foreign Application Priority Data

Jan. 13, 2012 (DE) .................. 10 2012 000 467

(51) Int. Cl.
*B01D 46/00* (2006.01)
*F02M 35/02* (2006.01)
*F02M 35/024* (2006.01)
*B01D 46/10* (2006.01)
*B01D 46/52* (2006.01)

(52) U.S. Cl.
CPC ........... *B01D 46/0005* (2013.01); *B01D 46/10* (2013.01); *B01D 46/521* (2013.01); *F02M 35/0203* (2013.01); *F02M 35/02416* (2013.01); *F02M 35/02491* (2013.01); *B01D 2265/026* (2013.01); *B01D 2271/02* (2013.01); *B01D 2271/022* (2013.01); *B01D 2271/025* (2013.01)

(58) Field of Classification Search
CPC .......... B01D 46/0001; B01D 46/0005; B01D 46/10; B01D 2271/02; B01D 2271/022; B01D 46/521; B01D 2265/026; B01D 2279/60; F02M 35/0203; F02M 35/02416; F02M 35/02491
See application file for complete search history.

(56) References Cited

U.S. PATENT DOCUMENTS

2002/0124734 A1 9/2002 Spannbauer
2007/0209517 A1 9/2007 Uemura
(Continued)

FOREIGN PATENT DOCUMENTS

DE 202006020287 U1 3/2008
DE 102009009066 A1 8/2010

*Primary Examiner* — Robert Clemente
(74) *Attorney, Agent, or Firm* — James Hasselbeck

(57) ABSTRACT

Disclosed is an air filter element (200) for insertion into an air filter housing, comprising an intake surface (275), a discharge surface (285), a filter medium (210), and a filter element-retaining device (240) which extends along at least a section of the periphery of the filter medium (210), between the intake surface (275) and the discharge surface (285), and which includes a retaining arrangement (270) that radially projects from the filter medium (210).

17 Claims, 12 Drawing Sheets

(56) References Cited

U.S. PATENT DOCUMENTS

2010/0258493 A1 10/2010 Kindkeppel
2011/0308214 A1* 12/2011 Jessberger ......... B01D 46/0005
  55/502
2014/0260143 A1* 9/2014 Kaiser .................... B01D 46/10
  55/501

* cited by examiner

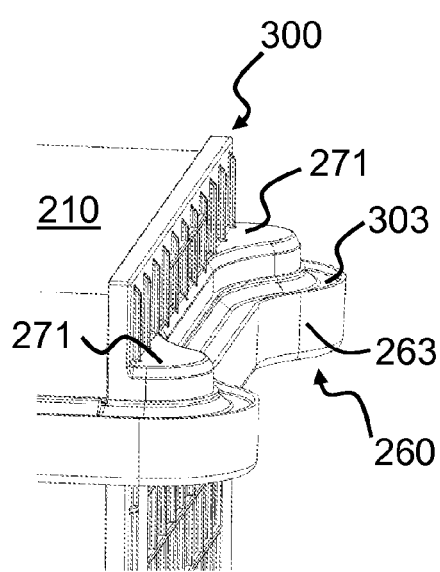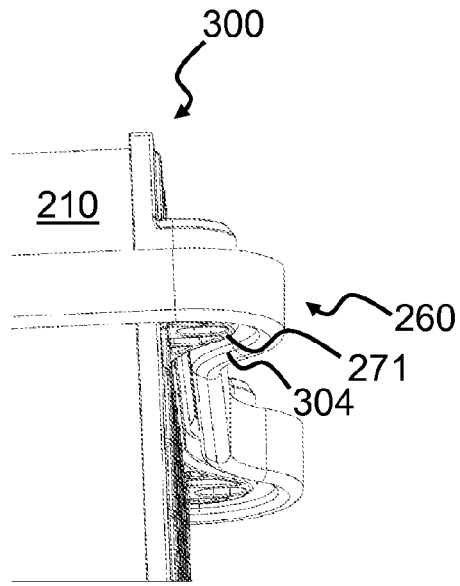
Fig. 11    Fig. 12
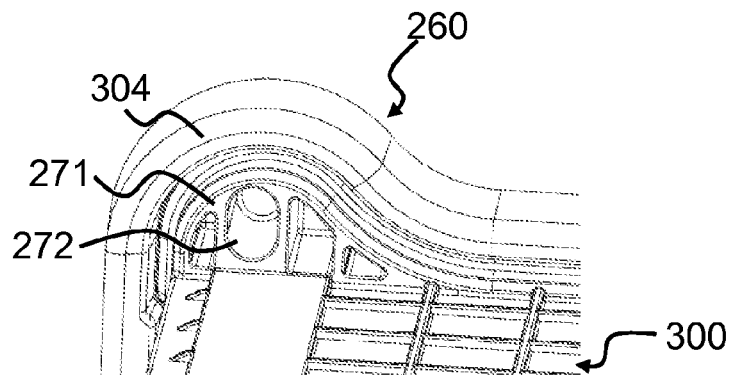
Fig. 13

AIR FILTER ELEMENT WITH RETAINING GEOMETRY

CROSS-REFERENCE TO RELATED APPLICATIONS

This application is a bypass continuation application of international application No. PCT/EP2013/050578 having an international filing date of Jan. 14, 2013 and designating the United States, the international application claiming a priority date of Jan. 13, 2012, based on prior filed German patent application No. 10 2012 000 467.2, the entire contents of the aforesaid international application and the aforesaid German patent application being incorporated herein by reference.

FIELD OF THE INVENTION

The present invention relates to a filter element, particularly to an air filter element, for example for air filtration in an automobile, an agricultural or construction machine, with a retaining geometry that enables the secure and space-saving arrangement of a filter element in an air filter housing.

BACKGROUND OF THE INVENTION

Air filters generally consist of an air filter housing and a replaceable filter element. The filter element can be replaced when it becomes loaded with dust after a certain operating time and the filtering performance decreases. The replacement of the filter element is generally done by the operator. To achieve an optimal filtering effect, it is necessary for the filter elements to be arranged in the air filter housing reliably and with positional precision in order to enable an optimum flow geometry in this way and, furthermore, to maintain a reliable seal between a raw air side and a clear air side. Since the replacement must oftentimes be performed by less-qualified personnel, a design is required in the filter element and filter housing that substantially prevents incorrect placement. For this purpose, filter elements are provided with retaining devices that make it possible to insert and position the filter element within the air filter housing such that reliable operation of the air filter is made possible. Such filter elements are known, for example, from WO 2010/099317. A filter element is described there that can be inserted into an air filter housing.

SUMMARY OF THE INVENTION

It can be regarded as one object of the invention to provide a filter element, an air filter housing and an air filter which enable operationally reliable positioning of a filter element in an air filter housing.

The object of the present invention is achieved by the subject matter of the independent claims, with additional developments being disclosed in the sub-claims.

According to the invention, an air filter element for insertion in to an air filter housing is provided in which the air filter element has an intake surface, a discharge surface, a filter medium and a filter element retaining device. The filter medium extends between the intake surface and the discharge surface in an axial direction of the air filter element, the filter element retaining device being connected to the filter medium. The filter element retaining device has a retaining arrangement projecting radially from the filter medium, as well as a seal arrangement with a seal line running around the filter medium. The radially projecting retaining arrangement is located between the circumferential seal line and the filter medium.

In this way, the air filter element can be designed compactly, particularly since it is no longer necessary to arrange additional elements outside of the seal line.

According to one exemplary embodiment of the invention, the seal arrangement is suitable for the axial and/or radial sealing of a raw side (unfiltered air) from a clean side (filtered air) through cooperation, for example, with an air filter housing.

According to another embodiment of the invention, the retaining arrangement has a radially projecting bulge. Preferably, the retaining arrangement has several radially projecting bulges.

According to one exemplary embodiment of the invention, the filter medium between the intake surface and the discharge surface has at least one edge on which a first filter medium side surface and a second filter medium side surface adjoin. The filter element retaining device has a radial bulge on the edge, the seal arrangement having a seal line running around the filter medium. The seal line runs along the radial bulge, the radius R2 along the course of the seal line being greater than the radius R1 of the edge. In other words, the seal line runs over the radial bulge.

In this way, a seal line can be provided with a large radius in comparison to the edge radius of a housing inner edge. This enables simplified application of a sealing mass or the receiving of a filter element that is provided in this way with a sealing mass. The radial bulge can extend substantially only over one of the side surfaces of the filter housing. Alternatively, the radial bulge can also extend beyond two adjacent side surfaces of the filter housing, particularly to the same extent.

According to one exemplary embodiment of the invention, the retaining arrangement has at least one recess in the axial direction, the recess being designed to receive an air filter housing-side projection. Instead of projections on the housing and recesses on the filter element, projections can also be provided in whole or in part on the filter element and recesses on the filter housing.

In this way, the air filter element can be positioned precisely in the air filter housing. Particularly, the recess enables control of the proper insertion of the filter element into the housing. If the recess of the air filter element is engaged with the projection of the housing, then the installation position is correct. If the recess of the air filter element is not engaged with the projection of the housing, this is immediately apparent, so that even untrained personnel notice that the installation position is incorrect. The recess can be a through hole or a blind hole. The hole can have a circular cross section, or an oval, elliptical or angular cross section.

According to one exemplary embodiment of the invention, the cross section of the recess decreases at least in part in the axial direction. Particularly, the recess tapers conically in the axial direction at least in part. In this way, the air filter element can be centered in the housing. Moreover, installation is simplified substantially, since the conical shape requires less target accuracy when the projection and recess meet. The conical taper can have the shape of a cone, a truncated cone or even a pyramid or truncated pyramid. However, the taper is not limited to a linear taper; it can also be a curved taper, for instance with the shape of a truncated paraboloid or a truncated ellipsoid.

According to one exemplary embodiment of the invention, at least one of the recesses is a slotted hole recess. In this way, tolerance-affected fixing can be achieved with respect to one direction. This enables impact or vibration compensation or temperature compensation. Furthermore, with a slotted hole, a contorted air filter housing can also be compensated for to a certain extent. The combination of a conventional hole and a slotted hole enables positionally precise fixing on the conventional hole despite tolerance on the slotted hole. A combination of a conventional hole with a first slotted hole and a second slotted hole extending transversely to it can also be provided. The plurality of holes can be distributed over various locations on the air filter element.

According to one exemplary embodiment of the invention, the retaining arrangement has a plurality of recesses in the axial direction that are arranged along the periphery of the filter element retaining device such that the recesses are distributed over an angle of at least 90 degrees. In this way, it can be ensured that the filter element according to the invention that is provided for axial installation is [not] inadvertently replaced by a filter element for radial installation. This increases the operational reliability of the air filter.

According to one exemplary embodiment of the invention, the retaining arrangement has a plurality of recesses in the axial direction, the plurality of recesses having an angular distribution with respect to a middle axis of the air filter element that defines a clear installation position of the air filter element in an air filter housing. In this way, it can be ensured that a correctly selected filter element is positioned incorrectly in the air filter housing nonetheless. Alternatively or in addition, the arrangement and/or the embodiment of the recesses can also be used for coding; that is, the installation of a filter element that is structurally identical for the most part but incorrect is prevented in this way.

Angular distribution is to be understood here as referring to the angle defined by two respective recesses in relation to a central axis. If the angles between different pairs of recesses differ, then the incorrect rotational positioning of the air filter element in a filter housing is impossible if the appropriate angular distribution is selected. It should be understood that this positional definition can also be achieved through an asymmetrical arrangement of different recesses that do not fit together with corresponding projections in the filter housing. Instead of projections on the housing and recesses on the filter element, projections can also be provided in whole or in part on the filter element, and recesses on the filter housing.

According to one exemplary embodiment of the invention, the filter element retaining device has a seal arrangement with a seal line running around the filter medium, the recesses being arranged at least in part between the circumferential seal line and the filter medium. In this way, the recesses can be arranged within a seal barrier. In this case, a blind hole-shaped recess can be expedient that does not create any opening between the raw air side and clean air side, but keeps these areas separate from each other instead. Furthermore, the outer dimensions of the filter element can be kept small, since it is no longer necessary to provide any recesses outside of the seal line.

According to one exemplary embodiment of the invention, the recesses arranged between the circumferential seal line and the filter medium are closed recesses. In this way, the raw air side can be kept separate from the clean air side.

According to one exemplary embodiment of the invention, the seal arrangement has an elastic seal material, and the seal line lies on the seal material. In this way, a reliable seal can be achieved that adapts to the gap to be sealed. The provision of a seal on the filter element ensures that a sensitive component of a seal is also replaced each time the filter element is replaced, and a new seal is always used. Otherwise, a replacement seal would also always have to be included in case a housing-side seal is defective.

According to one exemplary embodiment of the invention, the retaining arrangement has a retaining surface that is designed to transfer retaining forces between the air filter element and an air filter housing, the retaining surface being arranged between the circumferential seal line and the filter medium. In this way, an axial positioning of the seal element can be ensured. What is more, the positioning within the seal further limits the structural size of the filter element, since no additional surfaces have to be provided radially outside the seal.

Preferably, the retaining surface is arranged in an axially offset manner with respect to a sealing surface facing the same direction that is formed by a filter element-side seal arrangement. For example, an axially forward-shifted retaining surface is characterized by the advantage that the axial offset can prevent sealing mass from getting on the retaining surface upon shaping of the seal arrangement against the retaining arrangement. Moreover, it is advantageous in terms of production engineering if the corresponding retaining surface and sealing surface are arranged at the same level on sides of the filter housing. As a result of the filter element-side retaining surface being shifted axially rearward with respect to the sealing surface facing in the same direction, a defined pressing of the seal is ensured.

In one development of the invention that is characterized by an especially operationally reliable retention of the air filter element in the filter housing, the retaining arrangement, on mutually opposing sides, has a retaining surface arranged between the seal line and the filter medium. Consequently, the retaining surfaces face in opposite directions and designed, in turn, to rest against filter housing-side retaining surfaces. The filter element can be retained in both axial directions in an operationally reliable and positionally precise manner.

According to one exemplary embodiment of the invention, the profile of the seal line is curved in sections away from the filter medium. The partial curving-away constitutes a concave seal line when viewed from the side toward the filter element. Such an indentation enables positioning of additional structural elements, such as reinforcement ribbing, a brace, a fitting, or the like.

In one exemplary embodiment of the invention that is characterized by an especially uniform profile, the seal line runs along several sections so as to curve radially away from the filter medium, with a section being associated with each curved-away section in which the seal line runs so as to curve radially toward the filter medium. A structurally compact filter element results if the mutually associated sections follow each other immediately in the peripheral direction of the air filter element.

Preferably, the seal line runs in one or more sections so as to curve radially away from the filter medium with an at least nearly constant radius of curvature, and/or the seal line runs in one or more sections so as to curve radially toward the filter medium with an at least nearly constant radius of curvature. The curved sections consequently have the shape of a segment of a circle. For example, this simplifies the programming of the path of movement of a dispensing robot along the curved sections during the manufacture of the seal arrangement.

Alternatively or in addition, the seal line can have at least one curved section that is embodied in the shape of an elliptical segment, parabolic segment or hyperbolic segment. Likewise, it can be advantageous if the change in radius of curvature is embodied according to a constant function at least at the transition between a straight and a curved section. Preferably, this applies to the change in radius of curvature along at least almost the entire seal line.

In one development of the invention that is characterized by a space-saving structure, the seal line curves radially away from the filter medium along one section, runs straight alone one section and, in turn, curves radially away from the filter medium along one section with the three sections following each other, particularly immediately, in the peripheral direction of the air filter element. By virtue of this measure, a kind of indentation is produced in the region of the straight section in which housing-side fastening means can be arranged, for example.

According to one exemplary embodiment of the invention, the retaining arrangement extends in the axial direction along the filter medium over at least a portion of the filter medium, with the portion extending in the axial direction being embodied as a spacer from an air filter housing. In this way, the retaining arrangement can be used simultaneously as a spacer in order to support the filter element laterally in the air filter housing. This stabilizes particularly axially extended filter elements in the filter housing. The axial extension can be integrally connected to the retaining arrangement or be composed of several parts. The axially extended parts can be rigid or flexible or elastic. On a side facing away from the retaining surface, the axial extension can have an end tapering in the in the direction of the filter medium in order to facilitate insertion of the filter element into the air filter housing.

According to one exemplary embodiment of the invention, the seal arrangement is designed for the placement of the air filter element into an air filter housing along an axial direction. In this way, the filter housing can be provided with a peripherally closed housing body with axial opening through which the filter element can be inserted axially. The housing body can then be sealed with a corresponding lid. As a result of the peripheral seal, a good sealing effect can be expected in an axial seal.

According to one exemplary embodiment of the invention, the radial bulge extends substantially only over one of the outer edges of the filter element retaining device. In this way, the outer dimensions of the filter element can be minimized in one direction. Particularly, the bulge does not project beyond the adjacent outer edge. As a result of the fact that the bulge projects over one respective edge, the structural size of the filter element can be reduced with respect to the edge not projected over. In the case of several bulges on a filter element, the bulges can project over only two opposing sides of the filter element receptacle but not over the two other opposing sides. Particularly, four bulges can be provided, two of which are respective provided on two opposing sides, particularly near or directly on the axial edges of a filter element.

According to one exemplary embodiment of the invention, the radial bulge projects beyond the first side surface and the second side surface to about the same extent. In this way, the necessary projection length of the bulge can be reduced. Whereas the projection length is at least the length of the radius $R2$ in the case of projection over only one side surface and a prescribed minimum radius $R2$, in the case of uniform projection over two adjacent side surfaces at a 90 degree angle to each other, the projection length can be reduced to about $0.3*R2$ with the same minimum radius $R2$ without having to reduce the minimum radius $R2$.

According to one exemplary embodiment of the invention, the seal arrangement has an elastic sealing material running around the filter medium, with the sealing material running over the bulge. In this way, a sealing material to be applied can be applied easily, simply and quickly along the provided seal line.

According to one exemplary embodiment of the invention, the filter medium has four filter medium side surfaces, and the filter medium side surfaces and the intake surface and the discharge surface preferably run perpendicular to each other. This results in an easy-to-manufacture cuboid-shaped filter medium.

According to one exemplary embodiment of the invention, an air filter housing is provided that is designed to receive an above-described filter element. The air filter housing has an intake opening, a discharge opening and a filter element receptacle, with the filter element receptacle being located between the intake opening and the discharge opening. The filter element receptacle has a bulge facing radially away from a filter element to be inserted and a circumferential seal arrangement, with the seal arrangement having a circumferential seal line. The seal line runs in the radial bulge, the radius along the profile of the seal line being greater than the radius of a housing inner edge of the air filter housing located on the bulge.

According to one exemplary embodiment of the invention, the filter element receptacle has a retaining surface, the retaining surface being located between the circumferential seal line and the filter element to be inserted. In this way, no additional retaining surface need be provided outside of the seal arrangement, so the dimensions of the filter element can be kept small.

Preferably, the retaining surface of the filter element receptacle and a sealing surface of the filter element receptacle facing in the same direction are arranged at least substantially at the same axial level. Due to this symmetry, no manufacturing tolerances between the two surfaces have to be considered.

According to one exemplary embodiment of the invention, an air filter housing is provided that is designed to receive an above-described filter element, with the air filter housing having an intake opening, a discharge opening and a filter element receptacle. The filter element receptacle is located between the intake opening and the discharge opening, the filter element receptacle having a retaining surface and a seal arrangement with a seal line running around the air filter housing, and the retaining surface being arranged between the circumferential seal line and the filter element to be inserted. In this way, the air filter housing can have a compact design, particularly since additional elements need no longer be arranged outside of the seal line.

According to one exemplary embodiment of the invention, an air filter housing is provided hat is designed to receive an above-described filter element, the air filter housing having an intake opening, a discharge opening and a filter element receptacle. The filter element receptacle is located between the intake opening and the discharge opening, the filter element receptacle having a bulge facing radially away from a filter element to be inserted and a circumferential seal arrangement, and the seal arrangement having a circumferential seal line.

The seal line runs in the radial bulge, with the radius $R2$ along the profile of the seal line being greater than the radius $R1$ of a housing inner edge of the air filter housing located on the bulge. In this way, an air filter housing can be provided with a compact design with a seal line having a large radius in comparison to a radius of a housing inner edge, which is favorable for manufacturing. Particularly, such an air filter housing is suitable for appropriately receiving an above-described filter element with an analogous seal arrangement.

According to one exemplary embodiment of the invention, the air filter housing has a circumferential seal line, with the profile of the seal line curving in sections radially away from a filter element to be inserted. In this way, a sealing geometry can be provided on the filter housing that can provided space in the corresponding bulges of the sections of the seal line curving away for fittings, reinforcements or other elements, for example.

According to one exemplary embodiment of the invention, the filter element receptacle has at least one projection in the axial direction of the filter element, with the projection being designed to engage in a filter element-side recess.

In this way, a filter housing is provided that corresponds with the filter element described above. Particularly, the projections and the recesses can be coordinated with each other.

According to one exemplary embodiment of the invention, the filter element receptacle has a bulge facing radially away from a filter element to be inserted, with the seal line running in the bulge and with the radius along the profile of the seal line being greater than the radius of a housing inner edge of the air filter housing located on the bulge.

In this way, a seal profile can be provided that has a large radius in comparison to the edge radius of a housing inner edge. This enables simplified application of a sealing mass or receiving of a filter element that is provided in this way with a sealing mass. The radial bulge can extend substantially over only one of the side surfaces of the filter housing. Alternatively, the radial bulge can also extend beyond two adjacent side surfaces of the filter housing, particularly to the same extent.

According to one exemplary embodiment of the invention, an air filter with an air filter element as described above and an air filter housing as described above is provided, the air filter element being replaceably arranged in the filter element receptacle of the air filter housing. In this way, through replaceability, the filtering performance of the air filter can be ensured through replacement of the filter element.

The air filter element and the air filter, as described above and in the following, can be used particularly for air filtration in automobiles, construction or agricultural machines. Particularly, they can be used for the filtration of the intake air of a combustion engine or for the filtration of the air supply of the interior compartment of an automobile. However, they can also be modified such that they can be used for other fluids, particularly including liquids and liquid mixtures. Particularly, they can a design that is substantially equivalent structurally but be embodied as a fuel or oil filter element for automobiles or fuel or oil filters for automobiles.

As will readily be understood, the individual features can also be combined with each other, thus even obtaining advantageous effects that go beyond the sum of the individual effects.

These and other aspects of the present invention are explained and clarified with reference to the exemplary embodiments described here in further detail.

BRIEF DESCRIPTION OF THE FIGURES

Exemplary embodiments are described below with reference to the following drawings.

FIGS. 11 to 13 show various partial views of a filter element according to one exemplary embodiment of the invention;

DETAILED DESCRIPTION OF EXEMPLARY EMBODIMENTS

Figure 1:
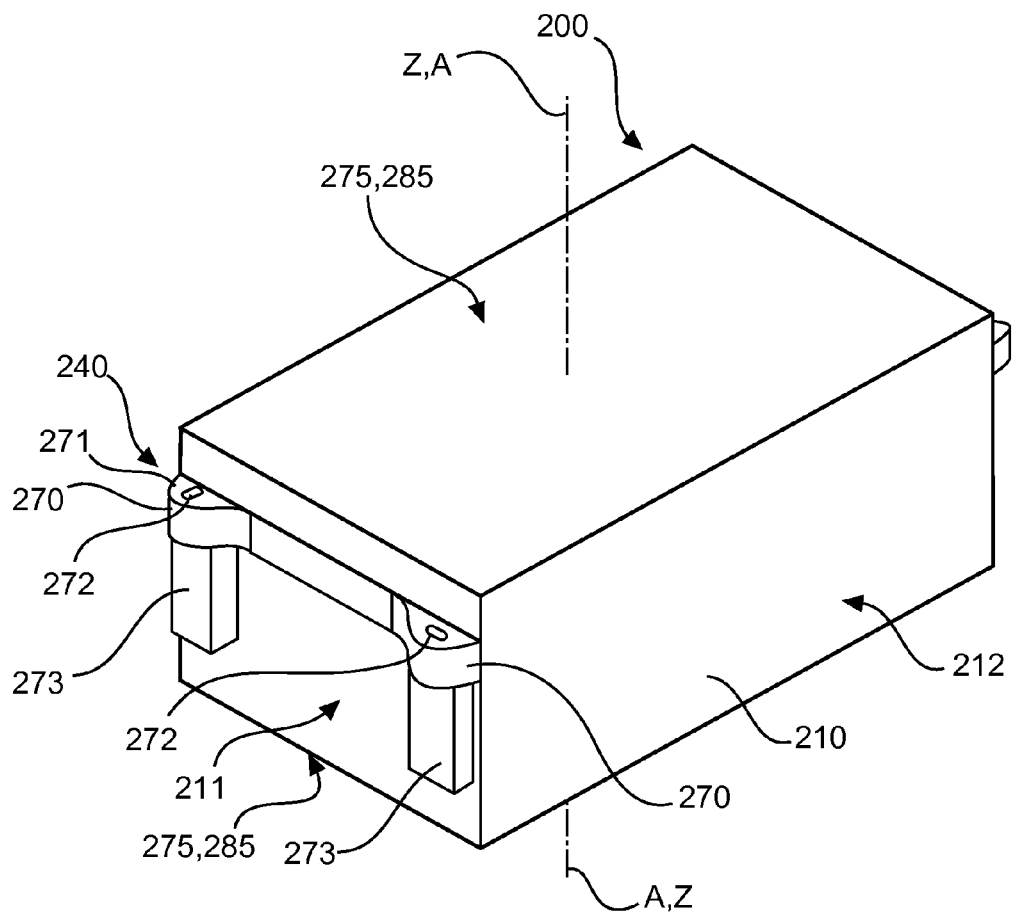
FIG. 1 shows an air filter element according to one exemplary embodiment of the invention.

FIG. 1 shows an air filter element 200 according to one exemplary embodiment of the invention. The air filter element 200 has an intake surface 275 and a discharge surface 285. In FIG. 1, the intake surface 275 can be both on the upward-facing side and on the downward-facing side (not visible). Particularly, the filter element 200 can be flowed through in both directions, so the intake side 275 and the discharge side 285 can also be exchanged. The filter element 200 has a longitudinal axis A that can be defined by the direction of flow and extends between the intake surface 275 and the discharge surface 285. It should be understood that the filter element 200 can also be offset, so that the longitudinal axis can be arranged so as to tilt toward the direction of flow. The longitudinal axis can particularly also be curved if, for instance, the intake surface and the discharge surface are not parallel to each other and/or the flow through the filter element 200 does not occur along a straight line but along a curve. Moreover, the air filter element 200 has a central axis Z. This central axis Z marks the midpoint or a certain axis of symmetry. It need also not necessarily match with the axis of longitudinal extension A, nor must it be parallel to this axis. The air filter element 200 has a filter medium 210 lying between the intake surface 275 and the discharge surface 285. This filter medium can consist, for example, of a paper or a plastic or a fleece or any other filter material. The filter medium can be fabricated in different ways. For example, the filter medium can be a filter bellows folded out of paper, or it can be a flute filter medium glued and layered from corrugated and planer layers. Furthermore, the filter element 200 has a filter element retaining device 240 that is used to fix the filter element 200 in the filter housing 105. The filter element retaining device 240 can be attached, for example, in segments on an outer lateral surface of the filter medium. Alternatively, the filter element retaining device can also be a shell, collar or strip running around the filter medium 210. The circumferential filter element retaining device 240 is expedient particularly if a circumferential sealing mass is to be provided on the filter element retaining device 240. To retain the filter element 200 in a filter housing, the filter element retaining device 240 has a retaining arrangement 270, the retaining arrangement 270 having retaining surfaces 271 that are capable of absorbing commensurate retaining forces that act on the filter element 200. These retaining forces can be transferred via the retaining surfaces 271 to the filter housing. The retaining arrangement 270 also has one or more recesses 272 that are capable of receiving a corresponding housing-side projection in order, for example, to fix the filter element 200 in the housing with positional precision. This recess 272 can be located, for example, on the retaining surface 271. The recess can be cylindrical or conical. It can be circular, elliptical, oval or angled. The seal arrangement can be embodied in the form of bulges that make it possible to lie on corresponding projections in a housing or recesses in a housing. The bulges can extend substantially only over one of the side surfaces. Particularly, if the bulges are arranged at the corners of the filter element 200, like in FIG. 1, they can be embodied such that they do not project beyond the (here:) long side surface of the filter element 200. The bulge need not necessarily be arranged on the corner but can also be arranged in the middle of a side surface of the filter element 200. If a plurality of bulges 243 are provided, they can project, for example, only beyond the narrow front sides 211 of the filter element 200 but not over the broad sides 212. Of course, the bulges can also project beyond the long sides 212 but not beyond the short sides 211. This reduces the structural size of either the width or the length of the filter element 200. The retaining device can also have spacers 273 that extend axially along the filter medium 210 in FIG. 1. These spacers 273 can secure a corresponding spacing of the filter element 200 in the filter housing 105 from a filter housing wall, so that the filter element 200 can be easily removed, for example, and has a defined contact and bearing surface with respect to the filter housing. Moreover, mechanical loads such as impacts or vibrations can be more easily absorbed in this way. The recesses 272 can have different designs, as will be explained in the following with reference to FIGS. 2 to 4.

Figure 2:
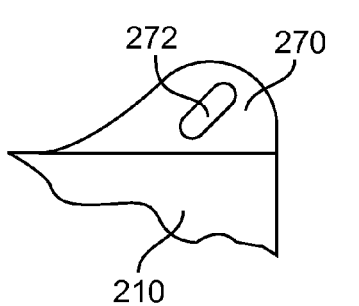
FIGS. 2 to 4 show detail of a recess according to one exemplary embodiment of the invention.
Figure 3:
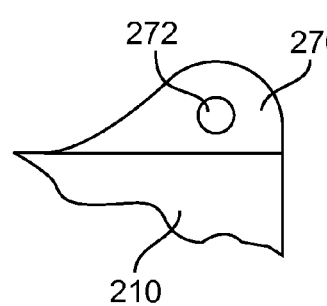
Figure 4:
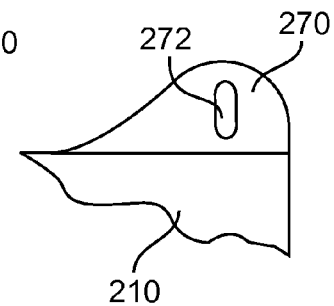

FIG. 2 shows an exemplary embodiment of a retaining arrangement in which a slot-like recess 272 can be provided on the filter element retaining device 240. In FIG. 2, this slot-like recess is arranged diagonally to an outer edge of the filter medium 210. Alternatively, the recess 272 in the filter element retaining device 240 can also be round, as can be seen in FIG. 3. Alternatively, the slot can also be arranged parallel to an outer edge of the filter medium 210, as is shown in FIG. 4. It should be understood that, alternatively to the embodiments of the recess shown according to FIGS. 2 *m* 3 and 4, the recess can also have other shapes, particularly with an angular outer contour or a free form or even a slotted hole with an alignment other than the alignment according to FIGS. 2 and 4. The recess 272 can be a recess that projects completely through the retaining arrangement 270. Alternatively, however, the recess 272 can also be a closed recess that can be embodied in the form of a blind hole, for example. This recess can then be provided both from the upper side of the retaining arrangement 270, as shown in FIG. 1. Alternatively, the recess can also be provided from below the retaining arrangement 210, which would not be visible in FIG. 1, however, in the case of a blind hole due to the perspective. The recess can be conical in order to achieve a centering effect. If several recesses are provided, a first recess 272 on a first bulge 243 can be circular. A second recess on a second bulge can have a slot in order to achieve a fixing of the filter element 200 via the first recess while enabling slight movement in a slot direction, for example in order to compensate for tolerance or thermal expansion. The retaining arrangement can constitute a bulge which, as shown in FIGS. 1 to 4, has a substantially continuously curved contour. In this way, a relatively simple seal can be achieved, as will be explained below.

Particularly in filter elements with small edge radii, one particular difficulty can be reliably sealing the filter element within an air filter housing in order to separate the clean air side from the raw air side. For a seal arrangement, it is therefore advantageous under certain circumstances if it has an enlarged radius. This is particularly important for the manufacturing process as well, in which a smaller change in the radius, which is to say a lesser curvature, facilitates the process of dispensing of the sealing material. In general, it is easier in a manufacturing process to travel over a larger radius than a sharp-edged transition on an edge. This is explained in further detail with reference to FIGS. 5 and 6.

Figure 5:
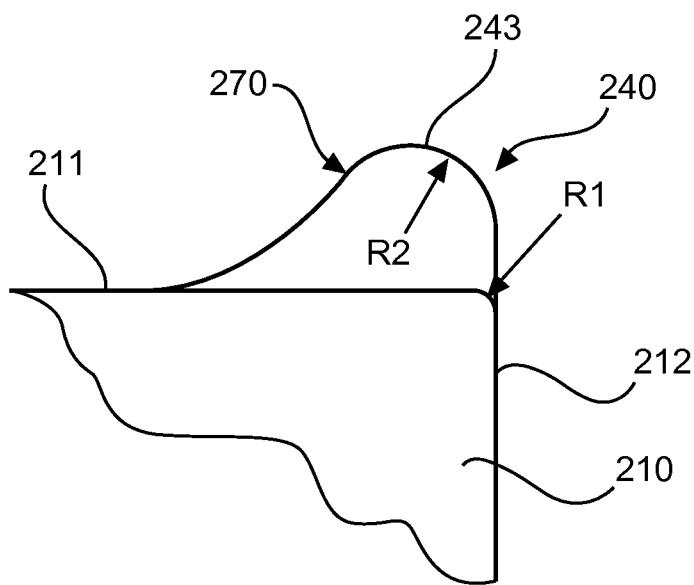
FIG. 5 shows detail of a retaining geometry according to one exemplary embodiment of the invention.

FIG. 5 shows a detailed view of a retaining arrangement 270, which is shown in the form of a bulge 243. This bulge extends from the filter medium 210 only beyond one side surface of the filter medium 210. However, the retaining arrangement 270 does not project beyond the side surface 212. For example, the contour can run straight along the side edge 212, then follow a radius R2 for about 135 degrees counterclockwise, then follow the radius R2 for about 45 degrees clockwise, and then follow the side surface 211 straightly again. In doing so, the bulge does not project beyond the side surface 212.

However, the bulge can also first follow a radius R2 for 225 degrees counterclockwise starting from the straight profile along the side surface 212, then follow the radius of R2 for 45 degrees clockwise, and then follow the side surface 211 again straightly. In the case of the latter geometry (FIG. 21), the bulge projects beyond both the side surface 211 and the side surface 212, particularly to the same extent. In both of the aforementioned cases, the radius is not smaller than R1. Thanks to the bulge 243, the curve radii that run through the seal line 261 in the corner region are larger than, in the event that the seal line 261 runs in the corner region in the immediate vicinity of the filter medium 210.

In order to apply a sealing mass in the arrangement shown in FIG. 5, a dispensing robot can now travel along the contour of the filter element 200 itself, although when an end of the side surface 212 is reached, a small radius R1 must be traveled in order to then apply a sealing mass along the side surface 211. This pronounced change in direction leads to inaccuracies in the dispensing and the danger of over- or under-dispensing the sealing mass. However, the bulge 243 enables a dispensing robot to travel a larger radius R2, which has a lesser gradient than the sharp-edged radius R1. In FIG. 5, the dispensing robot can now follow the contour of the retaining arrangement 270 beyond the side edge 212, so that it only has to travel along curves with a larger radius R2 in order to then reach the side surface 211 at the end of the retaining arrangement 270. FIG. 5 shows a retaining arrangement 270 and filter element retaining device 240, which is mounted only on a portion of the filter medium 210. When the retaining arrangement has such a geometry, the sealing mass can, if desired injected outside of the portion directly against the filter medium 210, particularly on the side surface 212 to the end thereof, then following the bulge and finally on the side surface 211. However, the filter element retaining device 240 can also have a circumferential collar on which the sealing mass can then be placed. The filter element retaining device 240 can, in turn, be adhered tightly with the filter medium 210.

Figure 6:
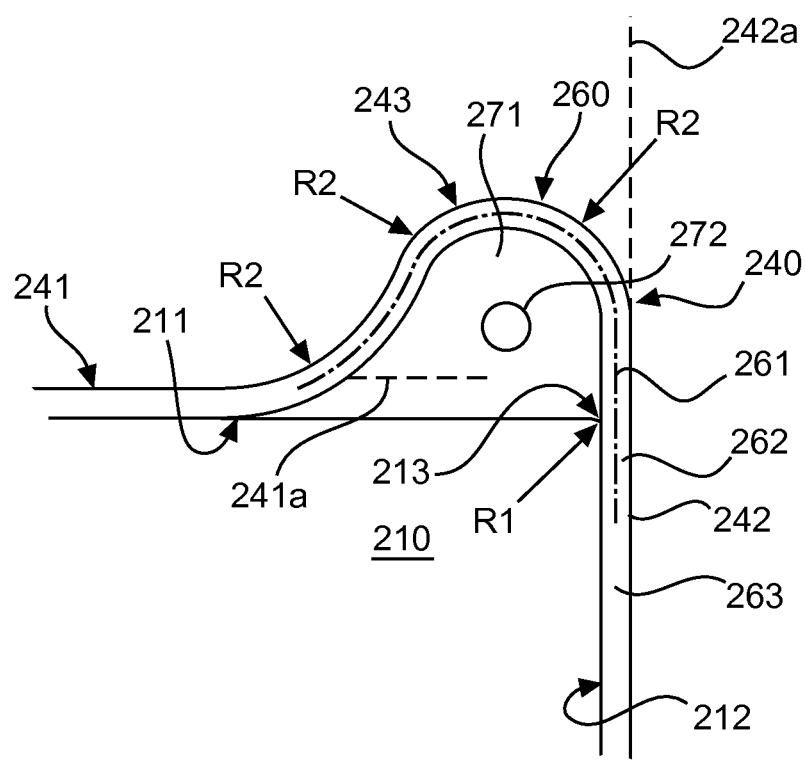
FIG. 6 shows a seal arrangement on a retaining geometry according to one exemplary embodiment of the invention.

FIG. 6 shows an exemplary embodiment of the invention in which the sealing mass 263 is applied onto a filter element retaining arrangement 240. The filter element retaining arrangement can project beyond the filter medium 210 and constitute a kind of collar onto which the sealing mass 263 can be applied. The illustration shown in FIG. 6 can also be viewed, however, as a representation of a circumferential filter element retaining arrangement 240 onto which a sealing mass still needs to be applied, with the dot and dash line representing a seal line 261 in both cases. The bearing surface of the filter element retaining arrangement 240 constitutes a sealing surface onto which an elastic sealing material 263 can be applied. In FIG. 6, it can also be seen that the radius of the sealing mass R2 is substantially greater than the radius R1 of the filter medium 210, so that a corresponding dispensing robot can travel along the seal line 261 at a substantially greater speed than a sharp edge 213 of the filter medium 210. In the embodiment shown in FIG. 6, the bulge 243 extends substantially only over the side surface 211 of the filter medium 210, but substantially not beyond the side surface 212. The bulge 243 extends in an angle sector that is formed by the outer edge 241 of the filter element retaining device 240 continued in the direction of the edge 213, indicated in FIG. 6 by a dashed line 241a, and a continuation of the second outer edge 242, which is indicated in FIG. 6 by a dashed line 242a. In this way, the entire width between the outer edge 242 of the filter element retaining device and the opposing side of the filter element retaining device (not shown) can be kept small, thus reducing the overall installed size of the filter element. The bulge 243 therefore has the function of enabling the radius of a sealing mass R2 to be kept large in order to enable a quick manufacturing process. What is more, however, the bulge 243 also has the additional function of providing a suitable place for a recess 272. Since this surface 271 is present anyway, it is no longer necessary to provide an additional surface in order to provide a retaining surface or a recess next to the seal with a large radius. The ear-shaped bulge 243 therefore has the combined function of both providing a retaining surface 271 and a surface for a recess 272, as well as an optimized surface for a seal arrangement 260. The recess 272 can be embodied as a blind hole. This has the effect that the recess does not constitute an air passage between the clean and raw air sides, particularly if the recess is located between the seal line 261 and the filter medium 210.

Figure 7:
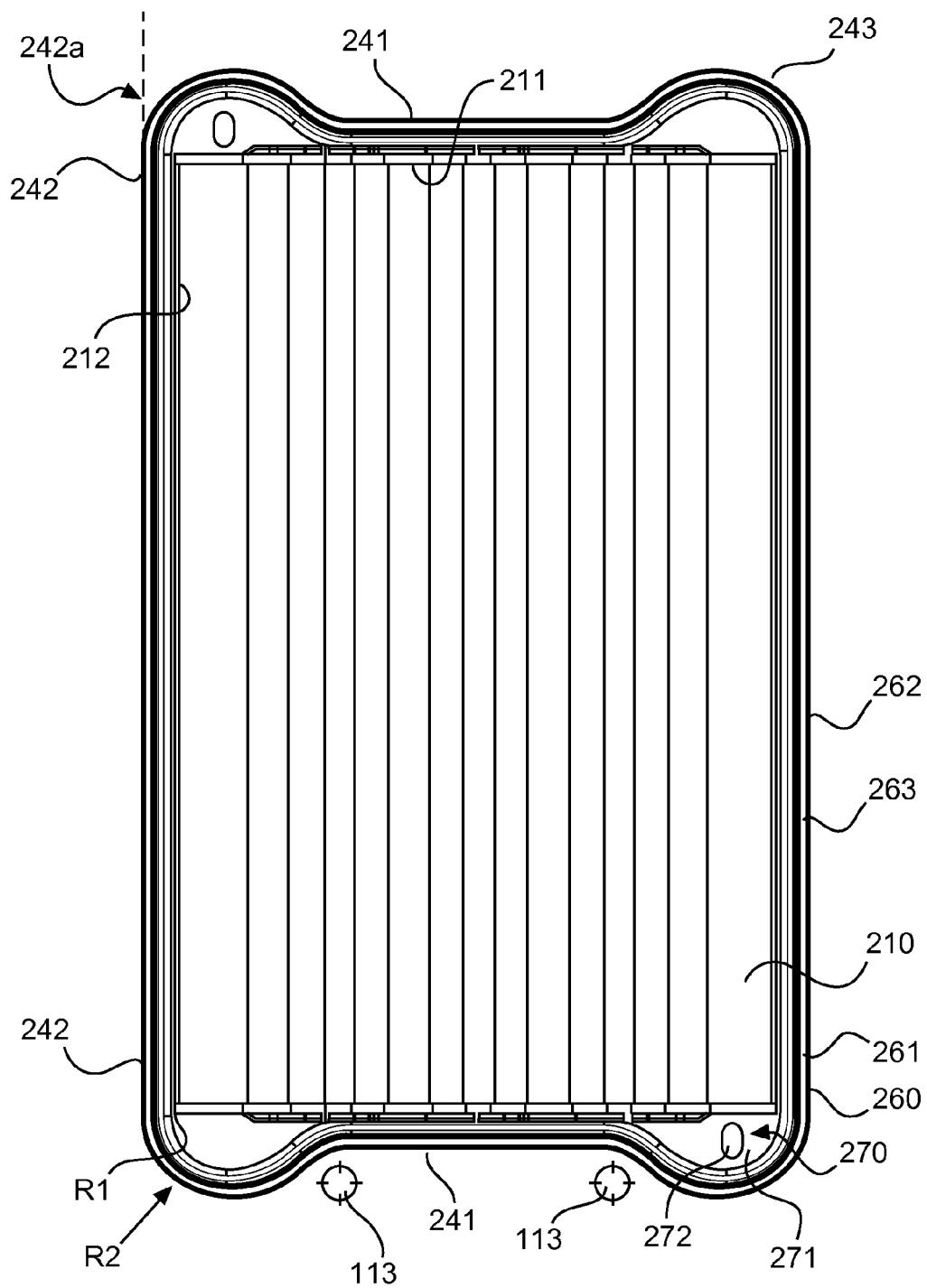
FIG. 7 shows a top view of a filter element according to one exemplary embodiment of the invention.

FIG. 7 shows a top view of a filter element 200 according to the invention. The filter element 200 shown in FIG. 7 has bulges 243 at each of its four corners. Here, too, analogously to the geometry of FIG. 6, these bulges 243 serve both to receive a seal arrangement 260 with an enlarged radius R2 and to provide a retaining surface 271. As a result, a recess 272 can be provided as needed on the retaining surface 271, or a recess can be provided in the retaining arrangement 270. Since the bulges 243 do not go beyond the outer edge 242 and its continuation 242a of the filter element retaining device 240, the overall width of the filter element 200 can be kept small. Particularly, the bulges 243 extend only at an angle that is formed between the outer edge 241 and its straight continuation 241a on the one hand and the continuation 242a of the outer edge 242 on the other hand.

In the following, the course of the seal line 261 is explained in detail with reference to FIG. 7. Starting from the middle of the left side of the air filter element 200 in FIG. 7, the seal line 261 first follows in the circumferential direction of the filter element 200 clockwise in a straight section of the filter medium side surface 212. At about the level of the edge between the filter medium side surfaces 212 and 211, the straight section transitions directly into a section curved radially toward the filter medium 210 (In FIG. 7, the section curved clockwise to the right). In this section, the seal line 261 has an at least nearly constant radius of curvature, for example in the range of about 20 to 40 mm, preferably in the range from 25 to 35 mm. This is therefore a circle segment-shaped section. The seal line 210 follows the circle segment-shaped section for about 135°. This is followed immediately by a section that curves radially away from the filter medium 210 (in FIG. 7, the section curved counterclockwise to the left) whose radius of curvature is nearly constant and about the same size as, and preferably somewhat smaller than, the radius of curvature of the previous section. This curved-away section extends over about 45°. Next comes a straight section along the filter element side surface 211 which, in another curved-away section, which has substantially the same radius of curvature (e.g., 20 to 40 mm) and the substantially the same angular dimension (e.g., about 135°) as the first curved-away section. Finally, this is followed by a section curved toward the filter medium 210 that, in turn, has substantially the same radius of curvature and angular dimension as the first curved-toward section. At the level of the edge between the filter medium side surface 211 and the other filter medium side surface 212, the curved-toward transitions into a long, straight section along the filter medium side surface 212. This is now followed again by curved-toward and curved-away sections, etc.

Overall, in order to form a bugle 243 in each, a section curved toward the filter medium 210 and a section curved away from the filter medium 210 are provided in each of the four corner regions of the air filter element 200. In the example shown in FIG. 7, all of the curved-away sections have the same radius of curvature and the same angular dimension as each other. In addition, all of the sections curved toward the filter medium 210 have the same radius of curvature and the same angular dimension as each other.

As indicated in FIG. 7, a recess 272 can be provided in the retaining surfaces 271. This recess is represented in FIG. 7 as a slotted hole. Analogous to the remarks on FIGS. 2 to 4, however, this slotted hole can also have another orientation. Alternatively, the recess can also have any shape. In particular, the recess can be embodied as a through hole. However, the recess 272 can also be embodied as a blind hole or as a closed recess. This recess enables a housing-side projection to be received, for example, in order to properly position the air filter element 200 in an air filter housing. Particularly in air filter elements that do not obviously have a preferred installation orientation, a corresponding projection on the housing side or a recess on the air filter element can ensure that the air filter element is inserted in a proper orientation into the air filter housing. After running along the longitudinal sides 212 of the filter element 200, and after running around the bulge 243, the sealing surface 262 and the seal line 261 can be guided again along the narrow side 211 of the filter element 200. As a result, the filter element 200 can have a small installed size between the corresponding bulges 243, so that, for example, housing-side devices 113, such as reinforcements or fittings, can be arranged in this region without having to make space available for this that projects beyond the filter element 200 and its bulge 243. For this purpose, the radius of the bulge can, for example, after passing through a 90-degree circle segment, pass through another 45-degree circle segment along the same curvature in order to then pass through an opposing curvature, again of one circle segment, then regaining an alignment that runs parallel to the outer edge 211. The radius R2 can be substantially maintained; only the curvature changes phasewise upon passing around the periphery from a rightward curvature to a leftward curvature, and vice versa.

Figure 8:
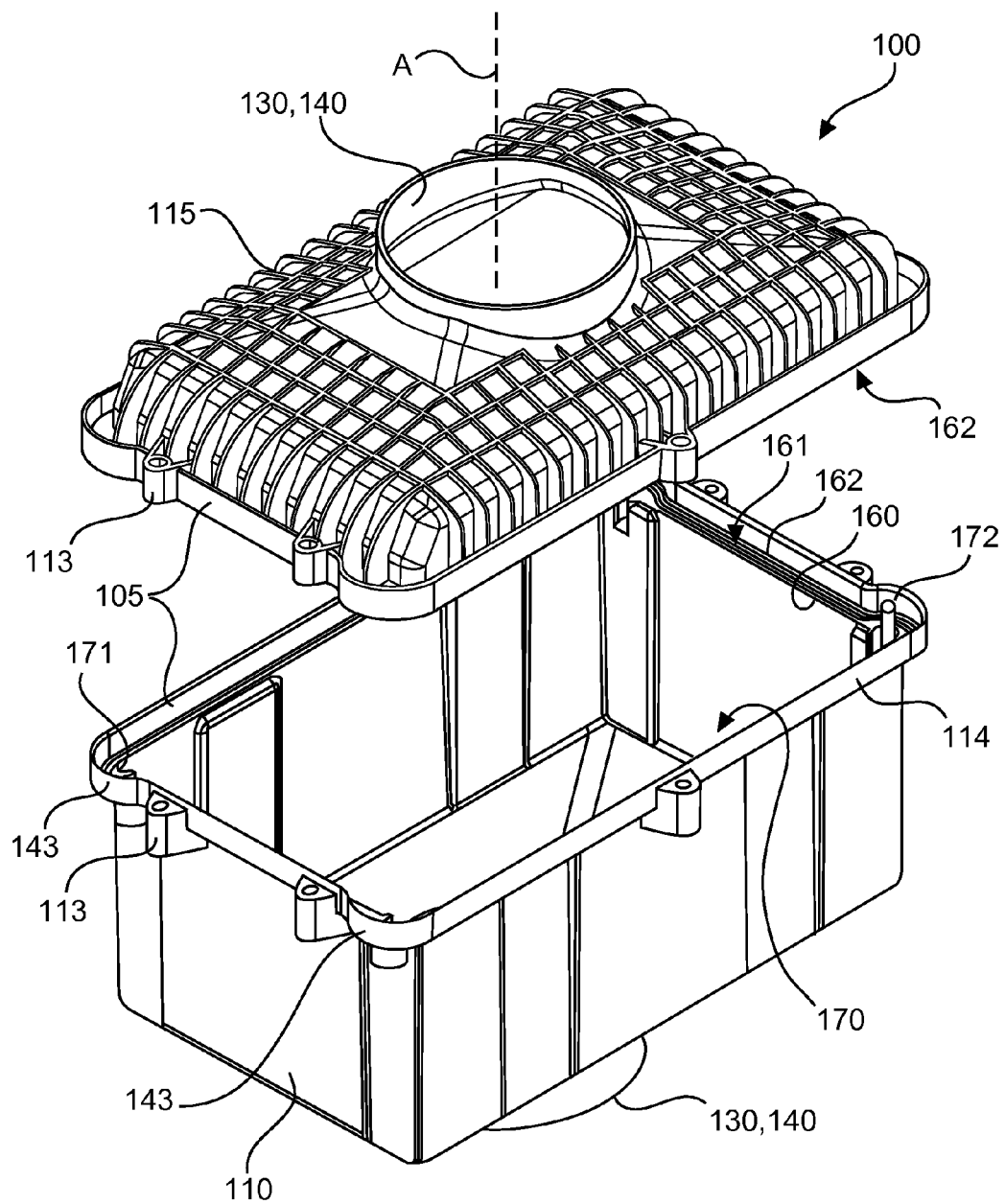
FIG. 8 shows an air filter housing for the insertion of a filter element according to the invention.

FIG. 8 shows an exemplary embodiment of an air filter housing for insertion of an air filter element according to the invention. The air filter housing 105 of an air filter 100 shown in FIG. 8 has a housing body 110 and a housing cover 115. An air inlet 130 and air outlet 140 are located in the embodiment shown in FIG. 8. This opening shown in FIG. 8 can be used both as an air inlet and, alternatively, as an air outlet. Likewise, an opening (not completely visible here) is present in the housing body 110 that can also be used both as an air inlet 130 and as an air outlet. In the embodiment shown here, the housing cover 115 has an arrangement of reinforcement ribs. The housing body 110 has a collar 114. This collar has a contour that corresponds to the outer contour of the air filter element 200. In this way, the filter element retaining device 240 can be mounted, for example, with the contour with its four bulges 243 (see FIG. 7) within the collar 114. The sealing mass 263 can be applied both on the upper side of the filter element retaining device and on the lower side. Accordingly, the corresponding mating sealing surface 162 of the housing-side seal arrangement 160 is located on the housing, either on the housing body 110 or on the housing cover 115. The seal line 161 is embodied as a circumferential seal line. As a result of the bulges 143, the seal line 161 runs not with an exclusively positive curvature on the housing, i.e. in a convex manner when seen from the outside, but rather also has concave sections in addition to the straight ones, particularly on the narrow sides. Appropriate fittings 113 can be arranged in a space-saving manner in the fluting of the concave seal line 161. Corresponding projections 172 can be provided in the housing that can project into the corresponding recesses 272 of the filter element 200. A filter element receptacle 170 is provided in the housing that can receive a corresponding seal arrangement 270 of the filter element 200. The projections 172 can be provided on this filter element receptacle 170. Through appropriate embodiment of the recesses 272 as slotted holes, a certain tolerance can be achieved in the positioning. Moreover, through appropriate embodiment of the projections 172 on the housing and of the recesses 272, it can also be ensured that the filter element 200 can only be inserted into the housing in one predetermined position. As can be seen in FIG. 8, corresponding housing-side devices 113, such as fittings, can be provided in the commensurately freed-up regions that lie between the bulges 243 of the filter element 200 and between the bulges 143 of the housing. In this way, the overall dimensions of the housing are not enlarged, even though the housing-side devices 113 project beyond the corresponding edge of the housing. Furthermore, the retaining surfaces 271 can rest on corresponding bearing surfaces 171 in the housing, so that a proper axial position of the filter element 200 can be achieved. What is more, through appropriately structured bearing surfaces, it can be achieved that the sealing mass 263 is compressed only to a certain maximum size in order not to be squashed by the fitting on the housing cover.

Figure 9:
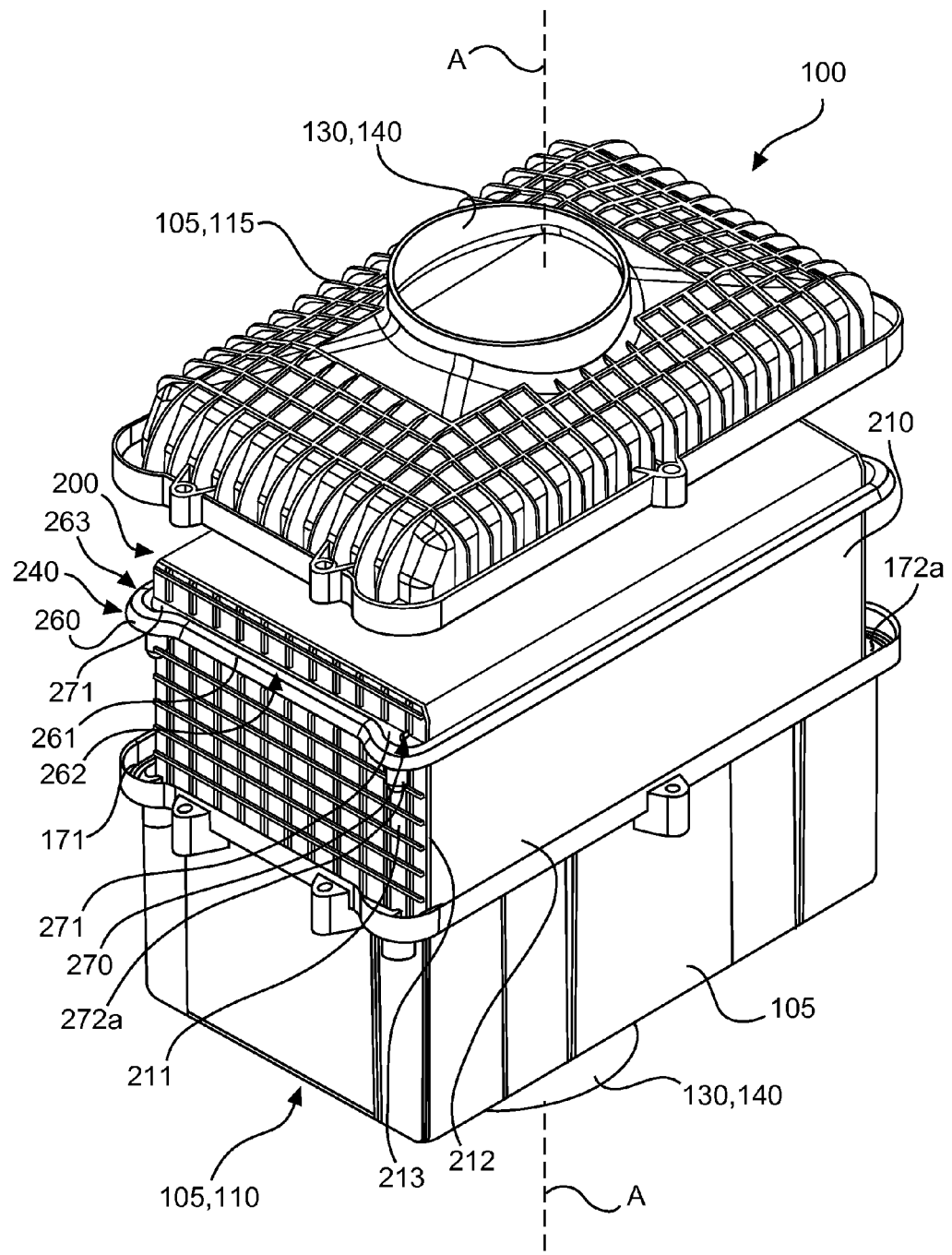
FIG. 9 shows a filter element inserted into an air filter housing according to one exemplary embodiment of the invention.

FIG. 9 shows an arrangement in which the filter element 200 is inserted into the air filter housing 105 in order to thus form an air filter 100 together with the air filter housing 105. FIG. 9 shows alternatively that, instead of corresponding recesses 272, corresponding projections 272a can also be provided that can engage in corresponding recesses 172a in the housing. For instance, through a combination of corresponding projections and recesses on a filter element 200 and appropriately corresponding projections and recesses on the air filter housing, it can be ensured that only the filter elements 200 fitting the air filter housing can be inserted. The projections and recesses can particularly be embodied such that an incorrectly fitting air filter element 200 projects from the air filter housing such that the cover 115 of the air filter housing can no longer be closed. The side surfaces 211 and 212 can also be provided with a reinforcement such as can be seen in the ribbed structure in FIG. 9 on the filter element. Particularly, the bulge 243 of the filter element retaining device 240 can be arranged on the side of the filter element 200, which is reinforced by an appropriate reinforcement structure. In this way, an appropriate retaining force can be applied to the filter element 200 and the filter medium 210, particularly via the already reinforced side 211 of the filter element 200. The seal can be applied both to a collar of the filter element retaining device 240 and to an outer edge of the filter element retaining device 240. In particular, an edge of the filter element retaining device can be coated with a sealing mass, particularly an elastic sealing mass, such that the sealing mass encloses the edge as an impact protection. The sealing mass can also be applied directly to the filter medium along the longitudinal sides 212 of the filter medium 210. Additional retaining geometries are not necessary required there in order to receive the sealing mass. The sealing mass can have different cross sections. Particularly, the cross section of the sealing mass can be rectangular, semicircular, trapezoidal or semielliptical or semioval. However, the cross-sectional shape of the sealing mass is not limited to the cross-sectional shapes mentioned.

Figure 10:
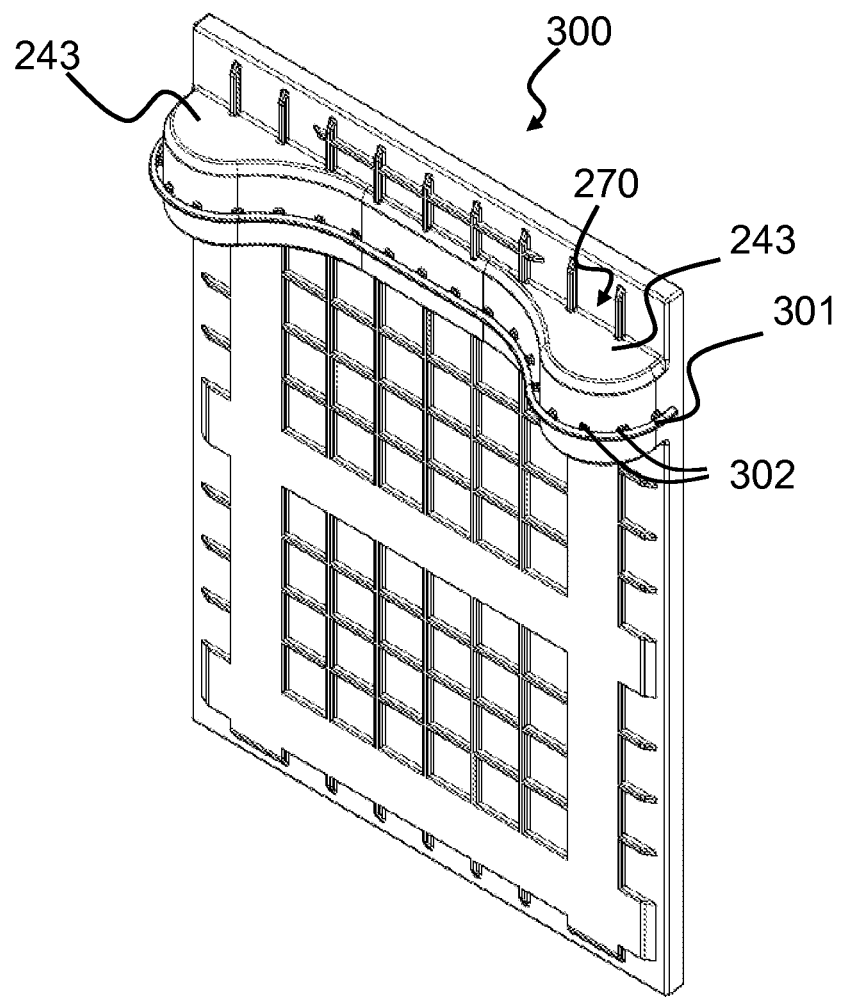
FIG. 10 shows an end plate of a filter element according to one exemplary embodiment of the invention.

FIG. 10 shows a reinforcement structure in the form of an end plate 300 of another example of an air filter element 200 of an air filter 100. The air filter 100 is identical for the most part to the air filter 100 described in FIGS. 7 to 9. Same or similar components are provided with the same reference symbols.

Attached to both filter medium side surfaces 211 of the filter element 200 is an end plate 300 shown in FIG. 10, for example by adhesion or welding of the end plates 300 to the filter medium 210. No reinforcement structure is provided on the two other filter medium side surfaces 212. In the case of a filter medium 210 folded in a zigzag, the end plates 300 are also used to seal the pleated pockets laterally. The sole end plate 300 is preferably made of (hard) plastic, particularly as an injection-molded part.

As part of the filter element retaining device 240, the retaining arrangement 270 is provided on the end plate 300 with two bulges 243. On the end plate 300 according to FIG. 10, the seal arrangement 260 is still lacking. To form the seal arrangement 260, the sealing mass 263 is molded against the end plate 300 such that the sealing mass 263 encloses a fastening bar 301. The fastening bar 301 is connected via a plurality of retaining bars 302 to the outer surface of the end plate 300. Particularly, the sealing mass 263 is cast or foamed onto the end plate 300. Preferably, a PUR material is used as the sealing mass 263. Particularly, the end plate 300 has a hard plastic and, as a sealing mass 263, a soft plastic. However, it is also conceivable for the entire end plate 300 to be cast or foamed on integrally with or without the sealing mass 263, for example of a PUR material.

FIGS. 11 to 13 show sections of the air filter element 200 with the end plate 300 from FIG. 10, with the sealing mass 263 in FIGS. 11 to 13 being already molded on. The sealing mass 263 forms a seal arrangement 260 having a circumferential sealing surface 303 running perpendicular to the longitudinal axis Z of the air filter element 200 (FIG. 11). A retaining surface 271, facing upward in FIG. 11, is provided on each of the bulges 243. The retaining surfaces 271 are offset axially forward with respect to the sealing surface 303. During foaming of the sealing material 263, this axial offset presents the sealing mass 263 from getting onto the retaining surface 271 as a result of inadvertent slight over-dispensing of the sealing mass 263.

On the opposite side of the seal arrangement 260, a second circumferential sealing surface 304 or sealing bead is provided (FIG. 12). A retaining surface 271, facing downward in FIG. 12, is provided at each of the bulges 243. These retaining surfaces 271 are offset axially slightly rearward with respect to the sealing surface 304. A view directly onto one of these retaining surfaces 271 is shown in FIG. 13. Besides a recess 272 for receiving a housing-side projection, it has additional recesses that merely serve to save plastic material.

Figure 14:
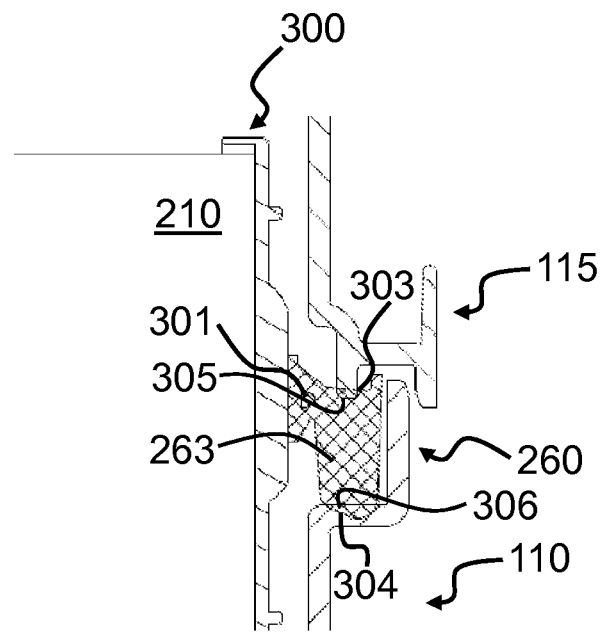
FIG. 14 shows a partial sectional representation of a filter element inserted into an air filter housing according to one exemplary embodiment of the invention.

FIG. 14 is a partial sectional view of the filter element 100 inserted into the filter housing 100 in the region of the middle of the end plate 300. A housing-side sealing surface 306 is pressed in the opposite axial direction onto the element-side sealing surface 304, which sealing surface 306 is embodied on a circumferential ledge of the housing body 110. This is an axial sealing geometry. FIG. 14 shows the sealing mass 263 in the non-pressed and non-deformed state. The sealing mass 263 does not in fact overlap with the housing-side components but is deformed such that it rests tightly against them. Furthermore, FIG. 15 shows how the sealing mass 263 encloses the fastening bar 301.

The housing cover 115 and the housing body 110 are each provided with housing-side retaining surfaces 171 (not shown in FIG. 14) that rest against the element-side retaining surfaces 271 (on the upper and lower sides of the bulges 243) in the assembled state of the filter element 200. This results in a solid support for the filter element 200 in the filter housing 100 over the bulges 243, at least in both axial directions. Preferably, the housing-side sealing surface 306 and the housing-side retaining surfaces 171 of the housing body 110 facing (upward) in the same direction run at the same axial level. Manufacturing engineering-related tolerance errors of the relative axial position of these surfaces are avoided.

Figure 15:
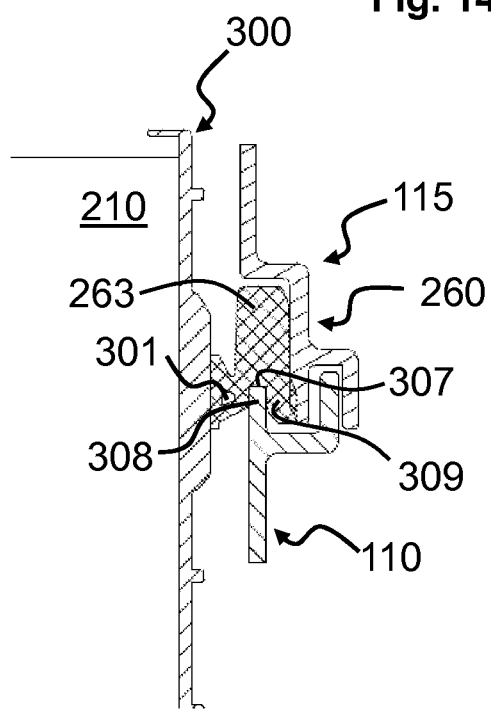
FIG. 15 shows a partial sectional representation of a filter element inserted into an air filter housing according to one exemplary embodiment of the invention.

FIG. 15 shows a sectional representation corresponding to FIG. 14 of another example of an air filter 100 and air filter element 200 with a somewhat modified sealing geometry. Otherwise, the air filter 100 corresponds to the examples described above. The sealing mass 263 enclosing the fastening bar 301 has a modified shape. It has a circumferential groove 307. In the assembled state, a housing-side seal bar 308 engages in this groove 307. The groove 307 and seal bar 308 are dimensioned such that the outer surface of the outer groove wall 309 is pressed radially outward against a housing inner wall. This results in a radial seal. In addition, the sealing mass 263 can also rest axially on the side opposite the groove 307 against a housing surface in order to stabilize the seal, or even in order to create an additional axial seal.

Figure 16:
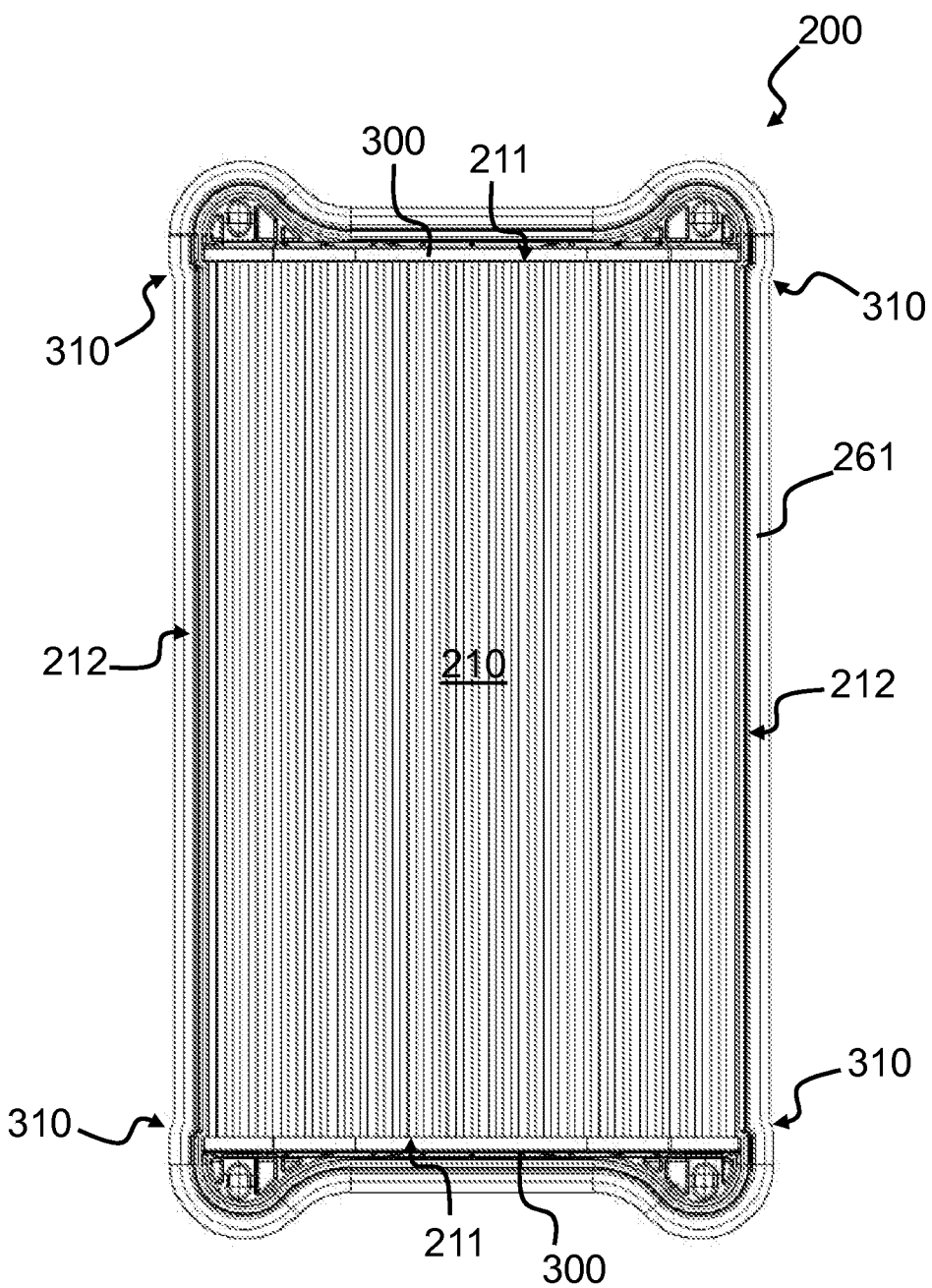
FIG. 16 shows a top view of a filter element according to one exemplary embodiment of the invention.

Another example of an air filter element 100 can be seen in FIG. 16 in a top view. The filter element 200 can be identical for the most part with the filter elements 200 described above. It has two end plates 300 that are connected to the filter medium side surfaces 211. For the sake of example, it is shown that the seal line 261, at the transition from a filter medium side surface 212 to the narrow outer edge surface of the end plate 300, runs respectively through an offset 310. In order to ensure the functionally reliable connection of the filter medium 210 to the end places 300, the latter must project laterally somewhat with respect to the filter medium 210. By virtue of the offsets 310, the filter element 200 can be designed with a smaller structure despite the end plates 300 projecting over laterally while providing the same volume for filter medium.

Figure 17:
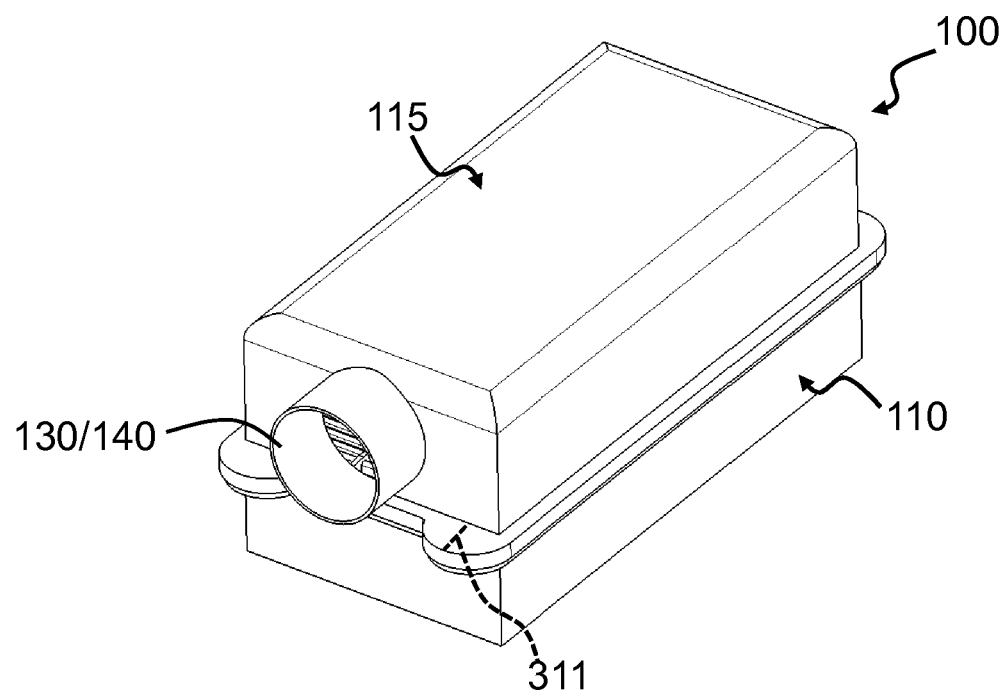
FIG. 17 shows a filter element inserted into an air filter housing according to one exemplary embodiment of the invention.
Figure 18:
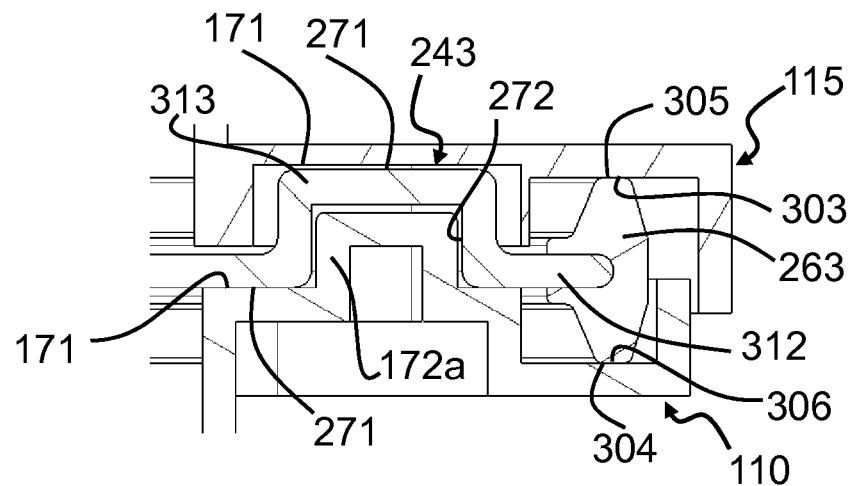
FIG. 18 shows a partial sectional representation of a filter element inserted into an air filter housing according to one exemplary embodiment of the invention.
Figure 19:
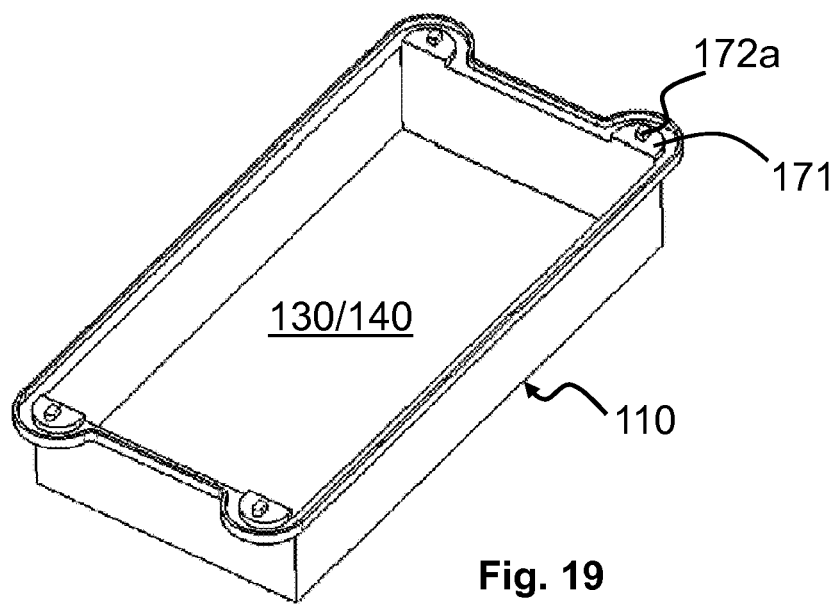
FIG. 19 shows a lower housing part of an air filter housing according to one exemplary embodiment of the invention.

Another example of an air filter 100 is described on the basis of FIGS. 17 to 20. FIG. 17 shows the air filter in the ready-to-operate state. The filter housing 105 has a removable housing cover 115 and a housing body 110. The housing cover is provided with a lateral discharge opening 130 and intake opening 140. Accordingly, the housing body 110 has an intake opening 140 and a discharge opening 130 (FIG. 19).

FIG. 18 is a partial sectional representation along the plane indicated in FIG. 17 by means of the dashed line 311. The sealing mass 263 is molded against a circumferential edge 312 of the filter element 200. The circumferential sealing surfaces 303 and 304 of the sealing mass 263 rest in a sealing manner against circumferential housing-side sealing surfaces 305 and 306. The edge 312 forms the bulges 243. The retaining surfaces 271, facing downward in FIG. 18, on the bulges 243 rest against the housing body 110 on corresponding retaining surfaces 171. The retaining surfaces 271 facing upward in FIG. 18 are spaced slightly apart from the corresponding housing-side retaining surface 171. However, they can also be designed such that they are also abutting. As a result of a hollow projection 313, a recess 272 is formed on the lower side of the bulge 243 in which a housing-side projection 172a engages. To save material, the projection 172a is also hollow.

Figure 20:
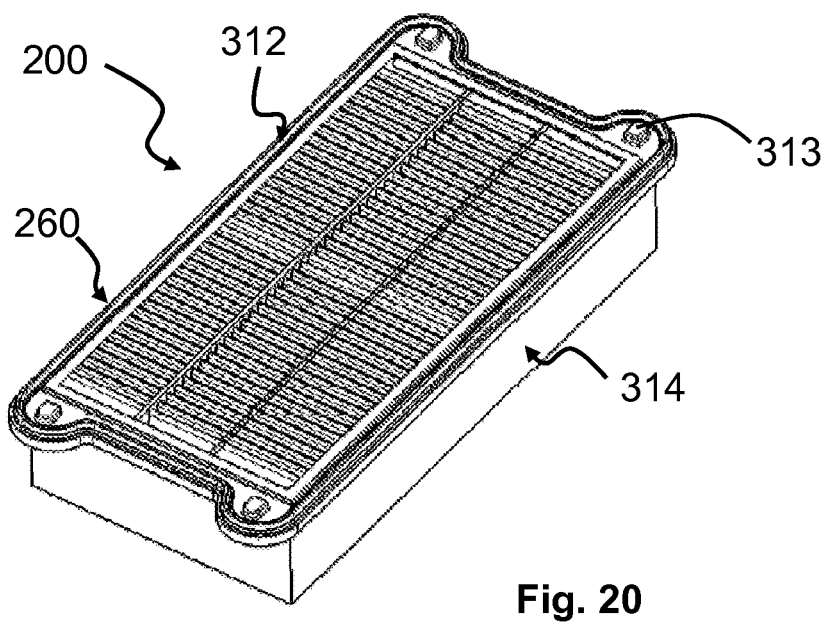
FIG. 20 shows a filter element according to one exemplary embodiment of the invention.

FIG. 20 shows the filter element 200 with the circumferential edge 312, which is provided with the circumferential seal arrangement 260, the bulges 243 and the hollow projections 313. For example, the filter element 200 also represents a variant of a filter element 200 having a circumferential frame 314. The circumferential edge 312 is part of the frame 314. However, it also serves to laterally seal and stabilize the filter medium 210. Preferably, the circumferential frame is made of plastic and injected by means of an injection molding process against the filter medium 210. It is therefore a plastic-coated filter element 200. The seal line 261 of the seal arrangement 260 runs according to the seal line 261 of the filter element 200 described by FIG. 7.

Figure 21:
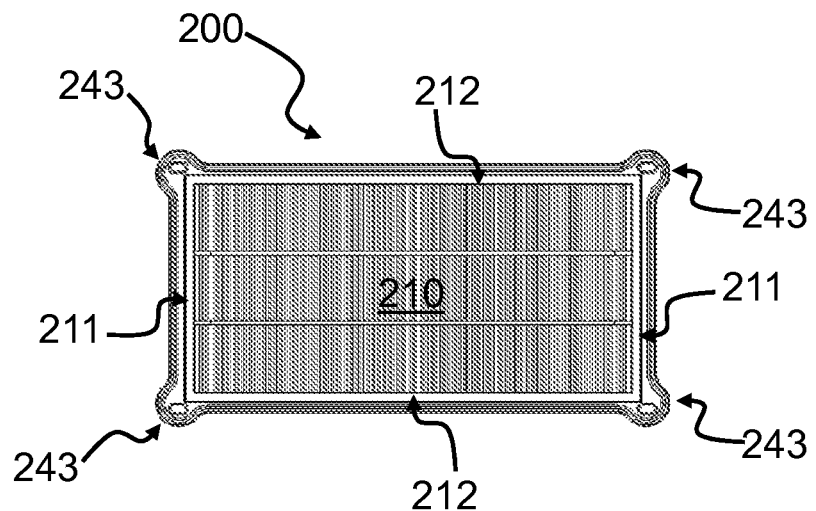
FIG. 21 shows a top view of a filter element according to one exemplary embodiment of the invention.
Figure 22:
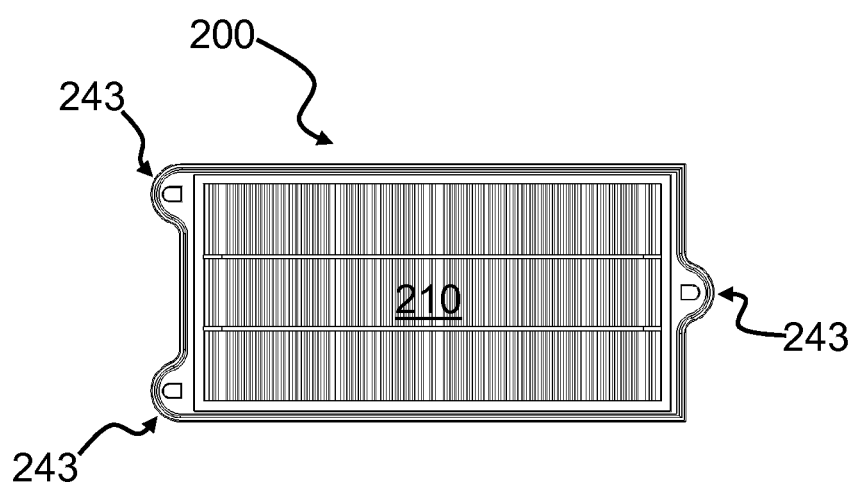
FIG. 22 shows a top view of a filter element according to one exemplary embodiment of the invention.

Two examples of filter elements 200 with a modified profile of the seal line 261 are shown in FIGS. 21 and 22. The filter elements 200 shown are also plastic-coated filter elements 200. However, a corresponding seal profile can also be implemented in filter elements 200 with two opposing end plates 300 or differently constructed filter elements 200.

Unlike the previously described elements 200, in FIG. 21 the bulges 243 face not only a filter medium side surface 211, 212, but also both filter medium side surfaces 211, 212, particularly by the same dimension. In the region of a bulge 243, the seal line 261 first runs along a section curved radially away from the filter medium 210, then along a section curving radially toward it, and finally along a section curved radially away again.

FIG. 22 shows an example of a filter element 200 that does not have a mirror-symmetrical construction, at least due to the embodiment of the bulges 243. By virtue of this measure, the filter element 200 can only be installed in a single predetermined position in the filter housing 105. In general, a clear installation position of a filter element 200 can be defined through shaping (e.g., radius of curvature, radial collaring, etc.) and/or by the number and/or position of bulges 243.

In general, it can also be advantageous to manufacture the bulges 243 or the entire retaining arrangement 260 or the entire filter element retaining device 240 from a polymer foam, particularly a PUR foam.

It should be noted that, in addition to air filters, the present invention can also be used in liquid filters.

It should be noted that the term "comprising" does not exclude other elements or method steps; likewise, the term "one" does not exclude several elements and steps.

The reference symbols used merely serve to increase comprehension and are not by any means intended to be regarded as limiting, the scope of protection of the invention being conveyed by the claims.

The invention claimed is:

1. An air filter element for insertion into an air filter housing (100), wherein the air filter element (200) has:
an intake surface (275),
a discharge surface (285),
a filter medium (210),
a filter element retaining device (240),
wherein the filter medium extends between the intake surface and the discharge surface in an axial direction (A) of the air filter element,
wherein the filter element retaining device is connected to the filter medium,
wherein the filter element retaining device (240) has a retaining arrangement (270) projecting radially away from the filter medium and a seal arrangement (260) with a seal line (261) running around the filter medium (210), the retaining arrangement (270) projecting radially away being located between the circumferential seal line (261) and the filter medium (210),
wherein the retaining arrangement (270) has a plurality of recesses (272) in the axial direction (A),
the plurality of recesses (272) having an angular distribution with respect to the middle axis (Z) of the air filter element (200) that defines a clear installation position of the air filter element in an air filter housing.

2. The air filter element as set forth in claim 1, wherein the seal arrangement (260) has an elastic sealing material (263) and the seal line (261) lies on the sealing material (263).

3. The air filter element as set forth in claim 1, wherein the seal arrangement (260) is designed for the introduction of the air filter element (200) into an air filter housing (100) along an axial direction (A).

4. The air filter element as set forth in claim 1, wherein the retaining arrangement (270) has at least one retaining surface (271) arranged between the seal line (261) and the filter medium (210), which retaining surface (271) is arranged in an axially offset manner with respect to a sealing surface (303, 304) facing in the same direction that is formed by the seal arrangement (260).

5. The air filter element as set forth in claim 1, wherein the retaining arrangement (270) has a retaining surface (271) arranged on each mutually opposing side between the seal line (261) and the filter medium (210).

6. The air filter element as set forth in claim 1, wherein the profile of the seal line (261) is curved in sections radially away from the filter medium (210).

7. The air filter element as set forth in claim 1, wherein the retaining arrangement (270) has at least one recess (272) in the axial direction (A), the recess being designed to receive an air filter housing-side projection (172).

8. The air filter element as set forth in claim 7, wherein the cross section of the recess (272) decreases at least in part in the axial direction (A).

9. The air filter element as set forth in claim 7, wherein at least one of the recesses (272) is a slotted hole.

10. The air filter element as set forth in claim 7, wherein the recesses (272) arranged between the circumferential seal line (261) and the filter medium (210) are closed recesses.

11. The air filter element as set forth in claim 1, wherein the filter medium (210) has at least one edge (213) between the intake surface (275) and the discharge surface (285) at which a first filter medium side surface (211) and a second filter medium side surface (212) adjoin each other,
wherein the filter element retaining device (240) has a radial bulge (243) on the edge,
wherein the seal arrangement (260) has a seal line (261) running around the filter medium (210),
wherein the seal line runs along the radial bulge, the radius (R2) along the profile of the seal line being greater than the radius (R1) of the edge.

12. The air filter element as set forth in claim 11, wherein the radial bulge (243) extends substantially only over one of the outer edges (241, 242) of the filter element retaining device (240).

13. An air filter housing that is designed to receive a filter element as set forth in claim 1, wherein the air filter housing has:
an intake opening (130),
a discharge opening (140),
a filter element receptacle (170),
wherein the filter element receptacle is located between the intake opening and the discharge opening,
wherein the filter element receptacle (170) has a retaining surface (171) and a seal arrangement (160) with a seal line (161) running around the air filter housing, the retaining surface being arranged between the circumferential seal line (261) and the filter element (200) to be inserted,
wherein the profile of the seal line (161) is curved in sections radially away from the filter element (200) to be inserted.

14. The air filter housing as set forth in claim 13, wherein the retaining surface (171) of the filter element receptacle (170) and a sealing surface of the filter element receptacle (170) are arranged at least substantially at the same axial level.

15. The air filter housing as set forth in claim 13, wherein the filter element receptacle (170) has a bulge (143) facing radially away from a filter element to be inserted, wherein the seal line runs in the bulge, the radius along the profile of the seal line (161) being greater than the radius of a housing inner edge of the air filter housing (105) located on the bulge.

16. The air filter housing as set forth in claim 13, wherein the filter element receptacle (170) has at least one projection (172) in the axial direction (A) of the filter element (200), the projection being designed to engage in a filter element-side recess (272).

17. An air filter with an air filter element (200) as set forth in claim 1 and an air filter housing (105) as set forth in claim 13, wherein the air filter element (200) is replaceably arranged in the filter element receptacle (170) of the air filter housing.

* * * * *